US006830331B2

(12) United States Patent
Jojiki et al.

(10) Patent No.: US 6,830,331 B2
(45) Date of Patent: Dec. 14, 2004

(54) MAGNIFICATION VIEWER

(75) Inventors: Masao Jojiki, Saitama-ken (JP); Phyo Kim, 1-13, Hanawada 5-chome, Apt#703, Utsunomiya-shi, Tochigi-ken (JP)

(73) Assignees: PENTAX Corporation, Tokyo (JP); Phyo Kim, Utsunomiya (JP)

( * ) Notice: Subject to any disclaimer, the term of this patent is extended or adjusted under 35 U.S.C. 154(b) by 0 days.

(21) Appl. No.: 10/268,891

(22) Filed: Oct. 11, 2002

(65) Prior Publication Data

US 2003/0107806 A1 Jun. 12, 2003

(30) Foreign Application Priority Data

Oct. 15, 2001 (JP) ........................................ 2001-316561
Apr. 10, 2002 (JP) ........................................ 2002-108300

(51) Int. Cl.[7] ................................................. G02C 9/00
(52) U.S. Cl. ........................................ 351/57; 351/158
(58) Field of Search ............................. 351/57, 47, 41, 351/158, 58, 48

(56) References Cited

U.S. PATENT DOCUMENTS 4,795,235 A * 1/1989 Spitzberg .................... 359/404
5,028,127 A * 7/1991 Spitzberg .................... 351/158

FOREIGN PATENT DOCUMENTS

JP 9-262210 10/1997

OTHER PUBLICATIONS

"SurgiTel Clinical Magnification System", General Scientific Corporation, http://www.surgitel.com/why.html., Jan. 8, 2002.

* cited by examiner

Primary Examiner—Hung Xuan Dang
(74) Attorney, Agent, or Firm—Greenblum & Bernstein, P.L.C.

(57) ABSTRACT

Magnification viewer includes a conventional glasses and a pair of magnifying lens units. The magnifying lens units are fixed to respective eyeglasses of the conventional glasses so that a wearer of the glasses can observe a magnified image of an object through the magnifying lens units. The magnifying lens unit includes an ocular and an objective lens that constitute a Galilean telescope. A prism is disposed between the ocular and the objective lens for deflecting the optical axis of the magnifying lens unit towards an object placed below the head of a wearer.

19 Claims, 14 Drawing Sheets

MAGNIFICATION VIEWER

BACKGROUND OF THE INVENTION

The present invention relates to an optical device, such as a magnification viewer, that is adapted to be supported on a wearer and allows the wearer to observe an object through a lens unit thereof.

Magnification viewers are used, for example, in surgeries, such as neurosurgery operation, which treat fine tissues and requires three dimensional magnification of the tissues that are difficult to distinguish with naked eyes.

FIG. 1 schematically shows a surgeon S having a conventional magnification viewer 100 on his head, sitting on a chair and carrying out a surgical operation. The magnification viewer 100 typically comprises a pair of spectacles 101 and a pair of magnifying lens systems 102 each of which being fixed to respective eyeglasses.

FIG. 2 is a cross sectional view of one of the eyeglasses 103 of the spectacles 101 and the magnifying lens system 102 fixed thereto.

The magnifying lens system 102 has a positive objective lens 102a and a negative ocular 102b which are housed within a lens barrel 102c to constitute a Galilean telescope.

The eyeglass 103 is provided with a hole 103a formed at a location lower than the center thereof. The magnifying lens system 102 is fixed to the eyeglass 103 in front of the hole 103a such that the optical axis of the magnifying lens system 102 inclines downwardly against the optical axis of the eyeglass 103.

FIGS. 3A and 3B schematically show side views of the surgeon observing an object with the conventional magnification viewer 100. In particular, FIG. 3A shows the surgeon observing a magnified image of the object through the magnifying lens system 102, and FIG. 3B shows the surgeon observing a normal image of the object through a portion of the eyeglass 103 above the magnifying lens system 102.

When the magnified image of the object is to be observed, the surgeon directs his/her face slightly downwards and turns his/her eyes considerably down, for example, for an angle of about 37 degrees, so that the object can be observed through the magnifying lens units. However, turning down the eyes for such a large angle causes much stress to the eyes and therefore the surgeon often complains extreme fatigue of the eyes.

When the normal image of the object is to be observed, the surgeon have to further incline the head downwards, for example, for an angle of 17 degrees as shown in FIG. 3B, to see the object through the upper part of the eyeglass 103 where the magnifying lens system 102 is not fixed. Such inclining of the head causes a significant fatigue at the neck, and if the surgeon have to keep the head inclined, or the neck bent, for a long time period, which may often happen in surgical operations, the neck may even be damaged.

It should be noted that the problems of the conventional magnification viewer described above in surgical operation also happens when utilized on a building site, in a underground mining or by restoration of paintings on a ceiling for observing objects above the head by inclining the head upwards.

Therefore, there was a need for a magnification viewer in which it is not required to extremely turn the eyes or incline the head for observing an object which is below or above the head.

SUMMARY OF THE INVENTION

The present invention is advantageous in that it provides an optical device that allows the observation of an object therethorugh which is not at the level of a head without considerably turning eyes or inclining the head.

According to an aspect of the invention, there is provided an optical device for observing an object therethrough. The optical device has a frame and at least one lens unit. The frame is adapted to be supported on a wearer. The lens unit is coupled to the frame so as to allow the wearer to observe an object therethrough. The lens unit includes a deflector that deflects a view direction of the wearer looking into the lens unit. Accordingly, the wearer can observe an object not at the same level of the head through the lens unit without considerably turning the eyes or inclining the head considerably.

Optionally, the lens unit provides a magnified image of the object so that the optical device can be utilized, for example, as a magnification viewer.

Further optionally, the optical device further includes at least one eyeglass that is held by the frame, and the lens unit is fixed to a portion of the eyeglass so that the wearer can observe an image not magnified by the lens unit through an other portion of the eyeglass.

Further optionally, the lens unit is fixed to the eyeglass such that the wearer can observe the object through the other portion of the eyeglass without inclining the head. For example, the lens unit is fixed the eyeglass at a location displaced from an optical axis of the eyeglass in a direction opposite to a direction in which the view direction of the wearer looking into the lens unit is deflected by said deflector. Such magnification viewer allows the wearer to alternately observe the magnified image and the normal image of the object by only turning the eyes.

Optionally, the optical device further includes a reflecting system which is disposed in front of the eyeglass, The reflecting system is disposed such that it bends a sight line of the wearer, looking through the other portion of the eyeglass, towards the object.

The reflecting system includes, for example, a half mirror, which is disposed on the optical axis of the magnifying lens unit between the object and the lens unit, and a mirror, which is disposed in front of the eyeglass on the sight line of the wearer looking through the other portion of the eyeglass. The half mirror reflects a part of the light coming from the object along the optical axis of the magnifying lens unit, and the mirror reflects the light from the half mirror towards the eye of the wearer. Accordingly, the wearer can observe the normal image of the object, or the image of the object not magnified by the magnifying lens unit, through the eyeglass without inclining the head.

Optionally, the lens unit includes an ocular and an objective lens constituting together a Galilean telescope, and the deflector, which may be a prism, is disposed between said ocular and said objective lens. The deflector is arranged such that it deflects the optical axis of the lens unit such that the image of the object observed therethrough is not inverted.

According to another aspect of the invention, a magnifying lens unit to be mounted to a pair of spectacles is provided. The magnifying unit includes an ocular having a first optical axis, a deflector disposed in front of the ocular and deflecting the first optical axis, and an objective lens having a second optical axis and disposed such that the second optical axis coincides with the first optical axis deflected by the deflector.

The magnifying lens unit arranged as above, allows one looking thereinto to observe an object that is not in a direction of the first optical axis without turning the eyes or head directly towards the object.

According to another object of the invention, a magnification viewer for observing an object therethrough is provided. The magnification viewer includes a pair of spectacles that has a frame and a pair of eyeglasses mounted to said frame, and a pair of magnification lens units each including an ocular and an objective lens. Each of the magnifying lens units is mounted to respective one of the eyeglasses. Each of the magnifying lens units includes a deflector for deflecting an optical axis of the magnifying lens unit so that the optical axis at the ocular inclines against the optical axis at the objective lens. The magnification viewer arranged as above deflects the view direction of a user looking into the magnifying lens unit and allows the user to observe an object without turning the eyes or inclining the head in order to direct the sight line toward it.

BRIEF DESCRIPTION OF THE ACCOMPANYING DRAWINGS

FIG. 1 schematically shows a surgeon having a conventional magnification viewer on his head;

FIG. 2 is a cross sectional view of an eyeglasses and a magnifying lens system of the magnification viewer shown in FIG. 1;

FIGS. 3A and 3B schematically show side views of the surgeon observing an object with the conventional magnification viewer shown in FIG. 1;

Figure 17:
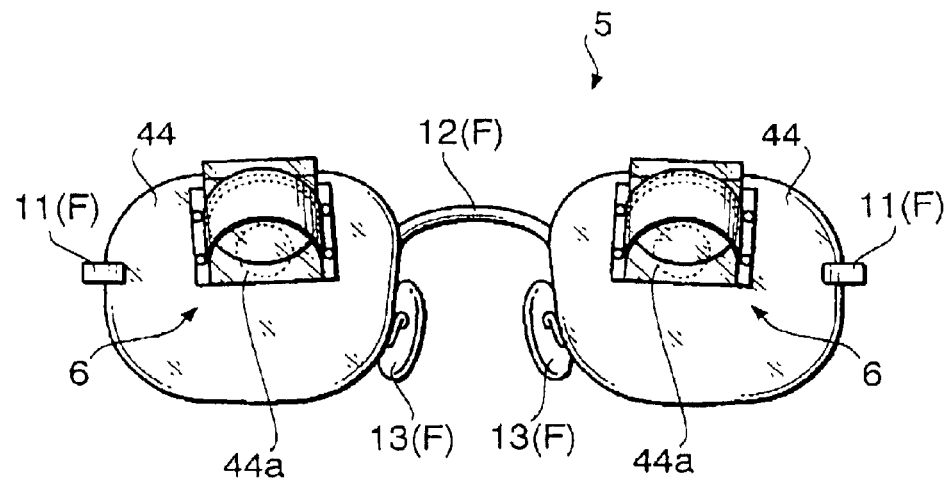
FIGS. 17 and 18 are front and top views of a magnification viewer according to a second embodiment of the invention, respectively.
Figure 18:
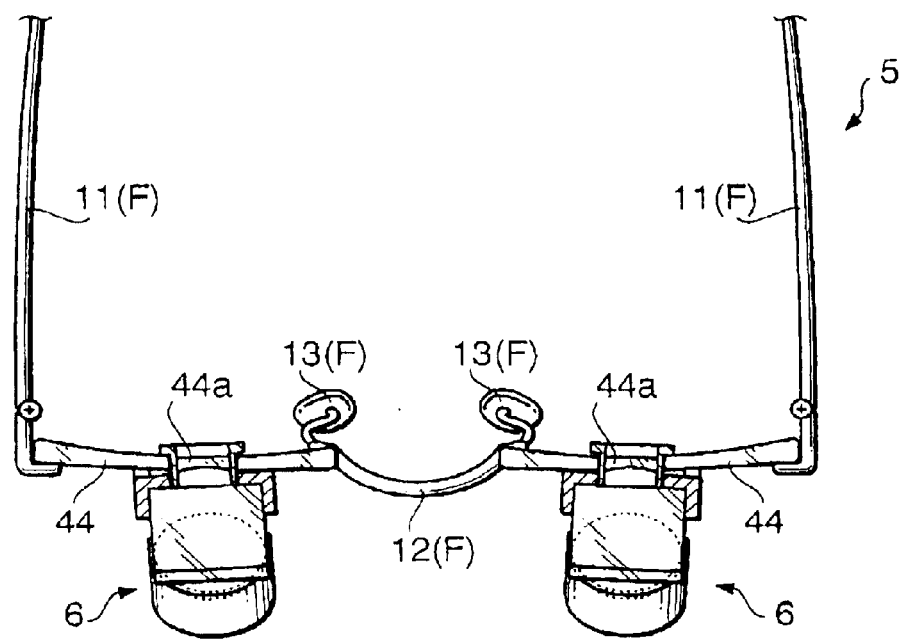
Figure 21A:
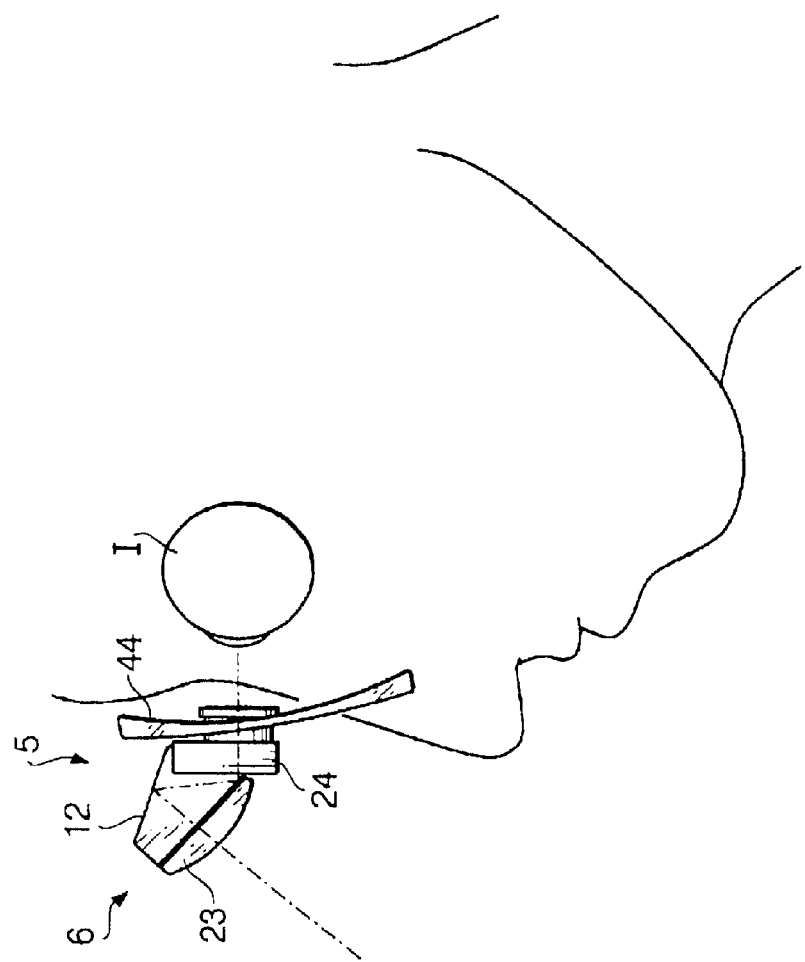
Figure 21B:
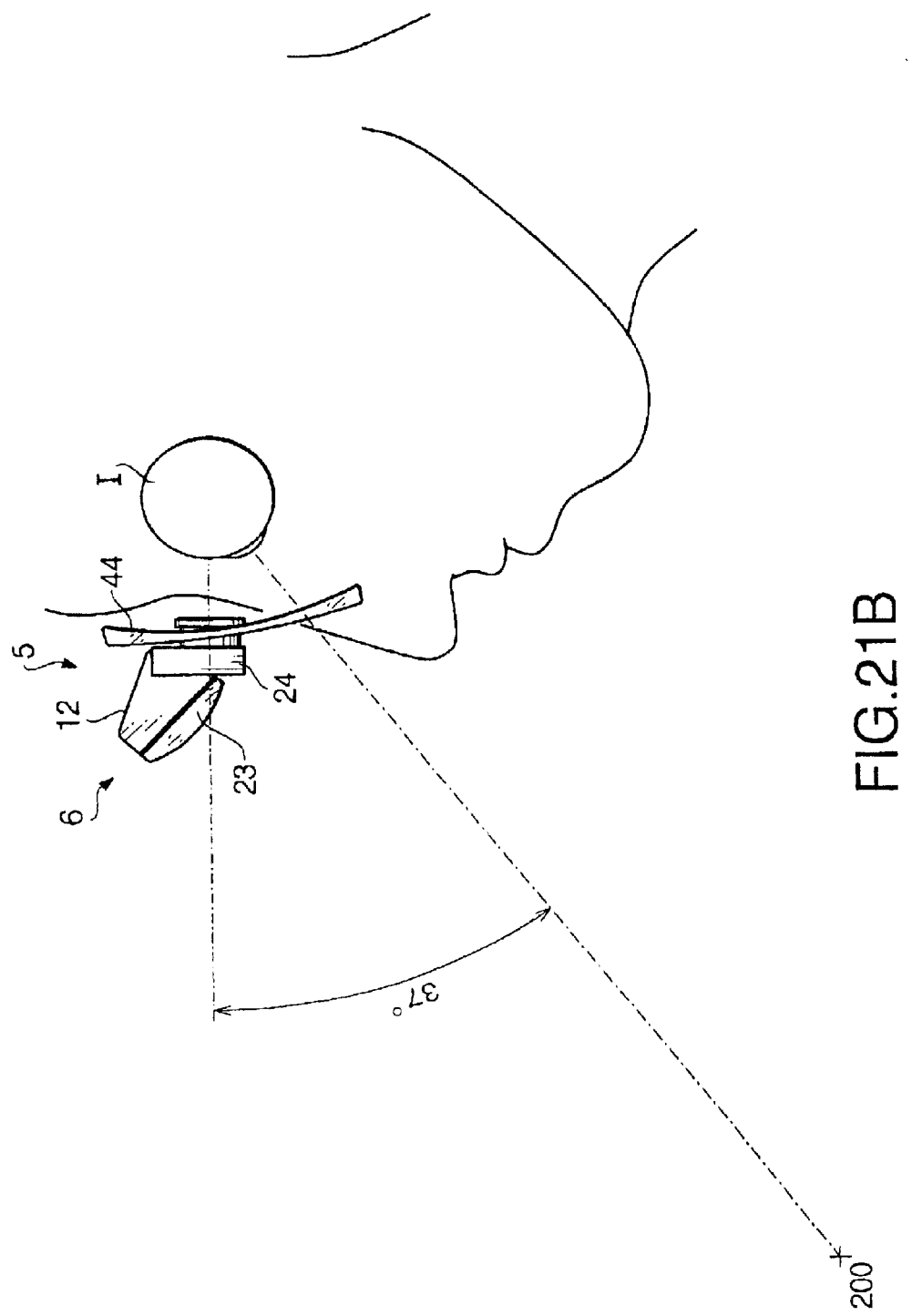
Figure 22:
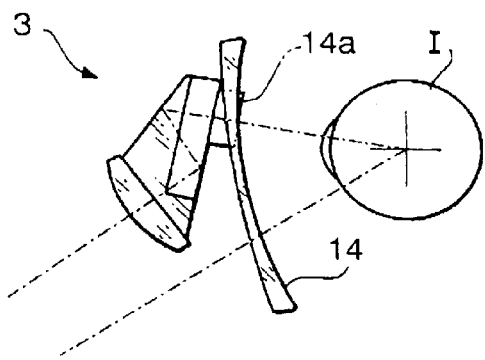
Figure 23:
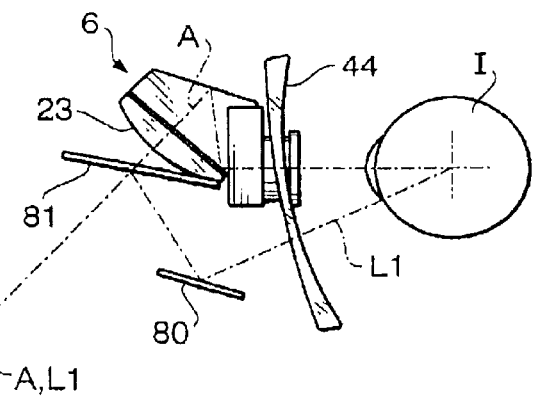
Figure 24:
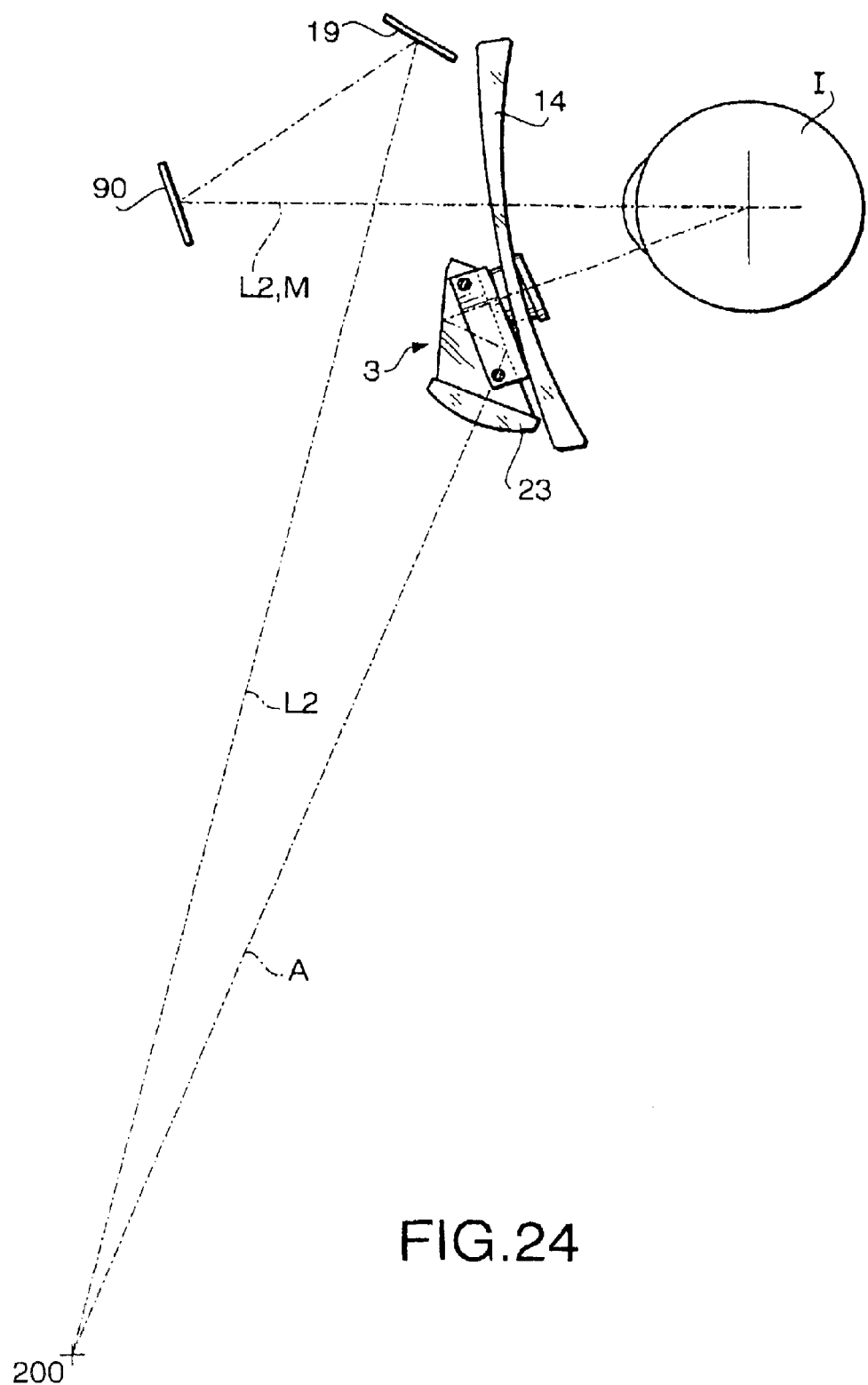

FIGS. 21A and 21B schematically show a wearer's head wearing the magnification viewer shown in FIGS. 17 and 18;

FIG. 22 schematically shows a part of a magnification viewer according to a third embodiment of the invention;

FIG. 23 schematically shows the arrangement of the mirror and half mirror of the magnification viewer according to the fourth embodiment of the invention; and FIG. 24 schematically shows the arrangement of the first and second mirrors of the magnification viewer according to the fifth embodiment of the invention.

DETAILED DESCRIPTION OF THE EMBODIMENTS

Hereinafter, embodiments of the present invention will be described with reference to the accompanying drawings wherein like reference numerals refer to like elements.

First Embodiment

Figure 1:
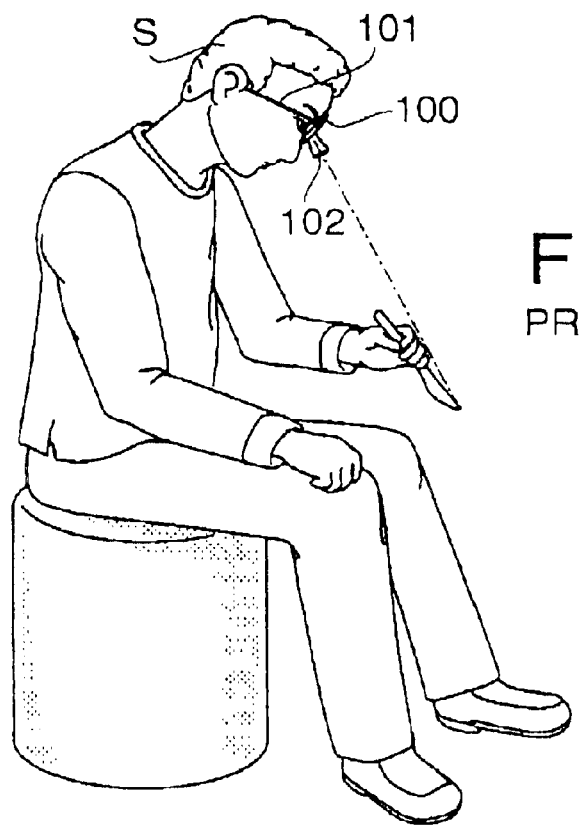
Figure 2:
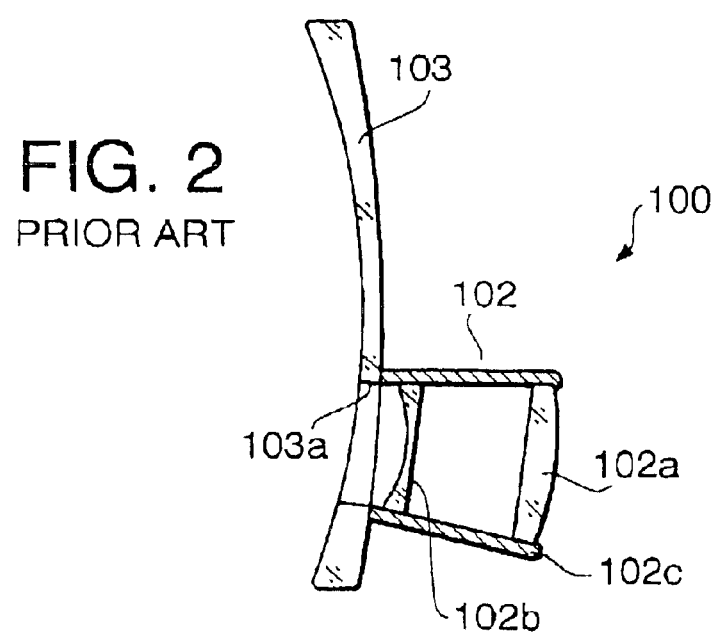
Figure 3A:
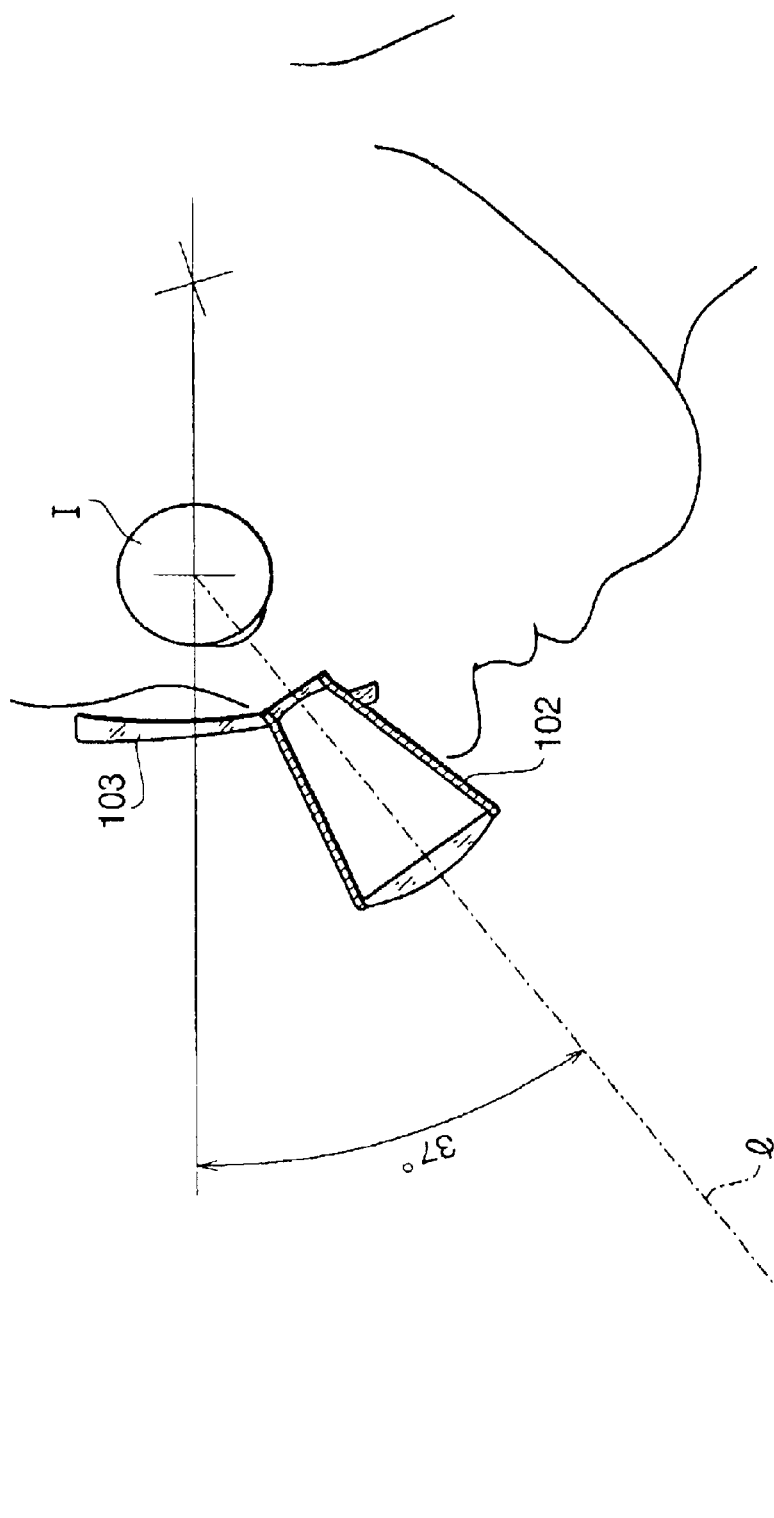
Figure 3B:
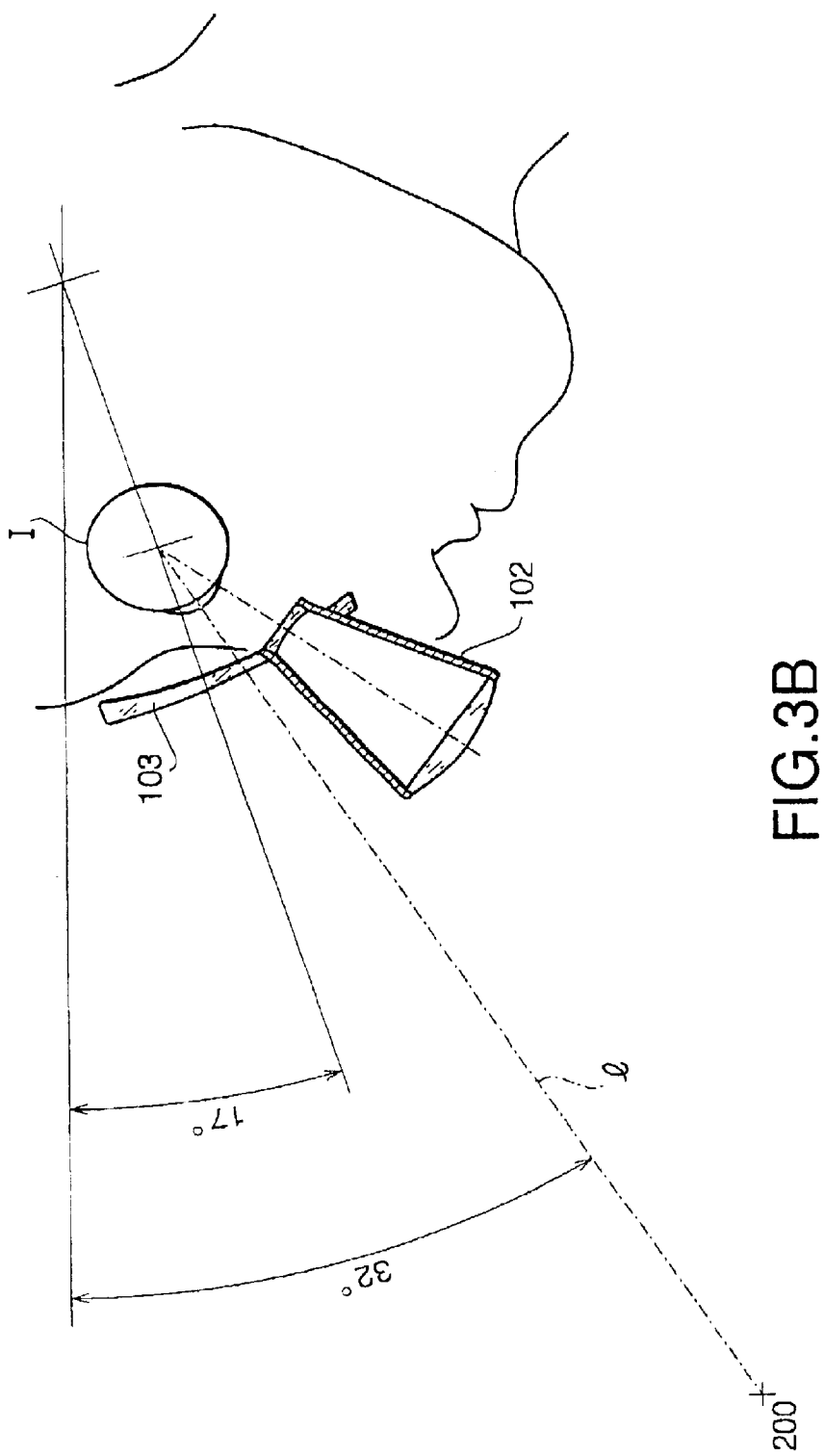
Figure 4:
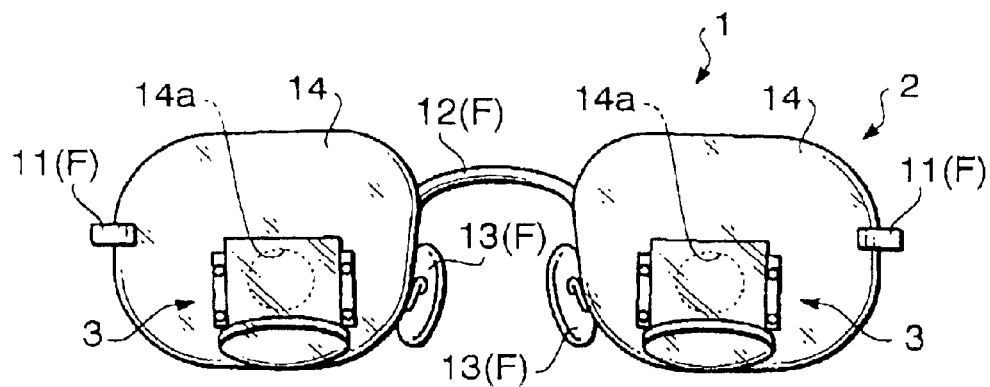
FIG. 4 is a front view of a magnification viewer according to a first embodiment of the invention.
Figure 5:
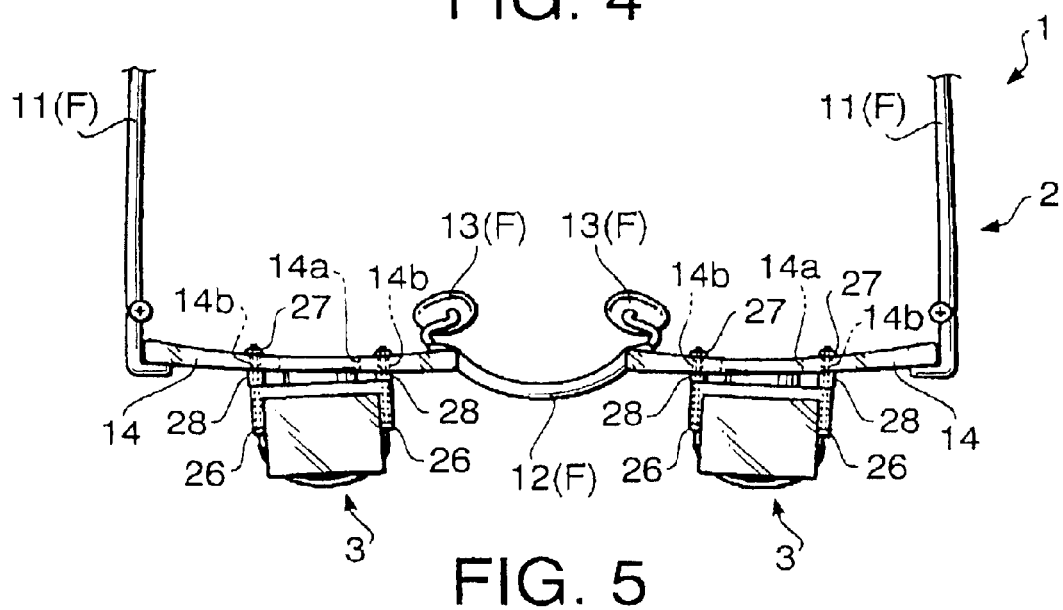
FIG. 5 is a top view of the magnification viewer shown in FIG. 4.

FIG. 4 is a front view of a magnification viewer 1 according to a first embodiment of the invention, and, FIG. 5 is a top view of the magnification viewer 1 shown in FIG. 4.

The magnification viewer 1 has glasses 2 and a pair of magnifying lens units 3, 3. The glasses 2 includes a frame F and a pair of eyeglasses 14, 14. The frame F is composed of a pair of temples 11, 11, a bridge 12 and a pair of nose pieces 13, 13. The eyeglasses 14, 14 are fixed to the frame F between the bridge 12 and the respective temples 11, 11. The nose pieces 13, 13 are fixed to respective eyeglasses 14, 14. Further the magnifying lens units 3, 3 are fixed to the front surface of respective eyeglasses 14, 14.

The eyeglasses 14, 14 may be positive lenses, negative lenses and even curved glasses having no power, depending on the eyesight of a wearer.

The type of the frame F is not limited to the above one and any other type which can be stably supported on the head of the wearer may be utilized. Thus, the frame F may also be replaced with one by which the temples, the bridge and the nose pieces are all integrated in one piece.

Figure 6:
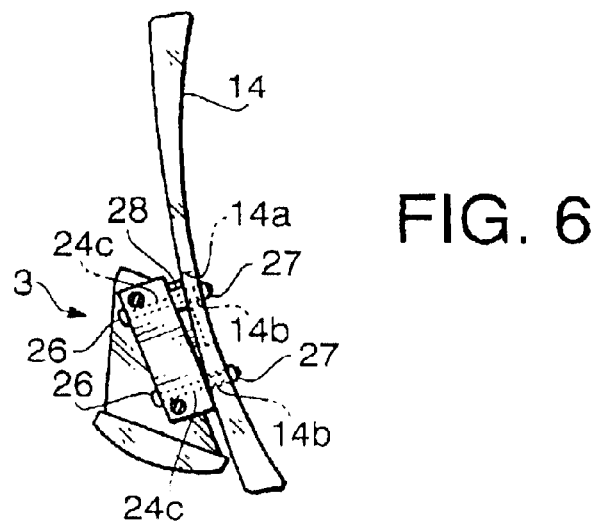
FIG. 6 is a side view of eyeglasses and a magnifying lens unit of the magnification viewer shown in FIG. 4.

FIG. 6 is a side view of one of the eyeglasses 14 of the magnification viewer 1 shown in FIG. 4 and the magnifying lens unit 3 fixed thereto.

As shown in FIG. 6, each eyeglasses 14 is provided with a circular through hole 14a. Each through hole 14a is formed at a location displaced slightly downwards from the center of the eyeglass 14, or the optical axis of the eyeglass 14. The through holes 14a, 14a are also formed such that the distance therebetween is slightly shorter than the wearer's pupil distance. Four fixing holes 14b for fixing the magnifying lens unit 3 to the eyeglass 14 by means of bolts 5 are formed around each through hole 14a.

Figure 7:
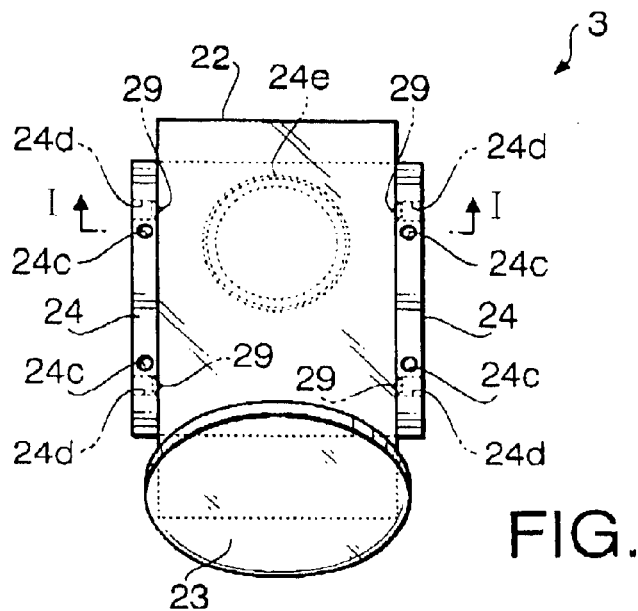
FIGS. 7 through 9 are a front view, a top view and a side view of the magnifying lens unit 3 of the magnification viewer shown in FIG. 4, respectively.
Figure 8:
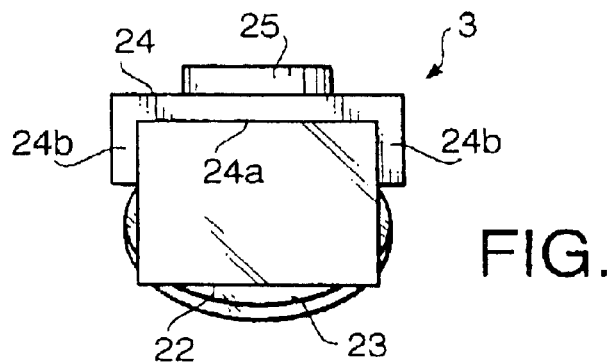
Figure 9:
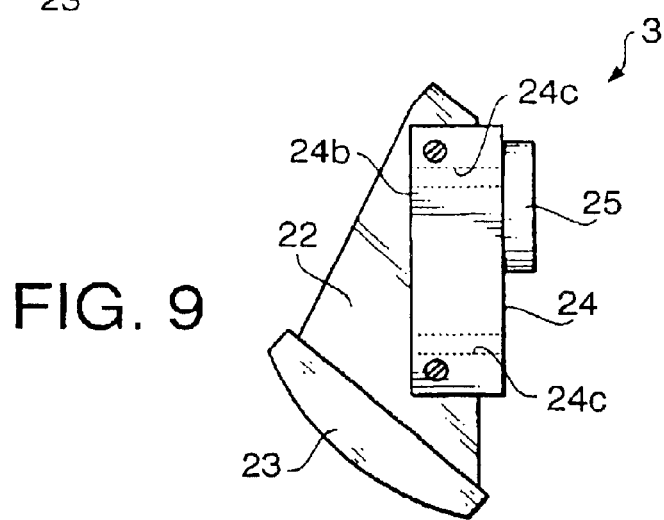
Figure 10:
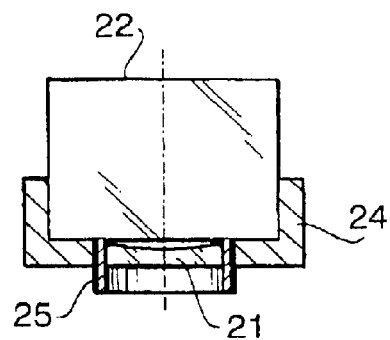
FIG. 10 is a sectional view of the magnifying lens unit taken along a line I—I in FIG. 7.

FIGS. 7 through 9 are a front view, a top view and a side view of the magnifying lens unit 3 of the magnification viewer 1 shown in FIG. 4, respectively, and FIG. 10 is a sectional view thereof taken along a line I—I in FIG. 7.

The magnifying lens unit 3 has a telescopic lens system composed of an ocular 21, a prism 22 and an objective lens 23. The magnifying lens unit 3 further has a base plate 24 for holding the prism 22, and a lens barrel 25 for holding the ocular 21 therein and mounted to the base plate 24.

Figure 11:
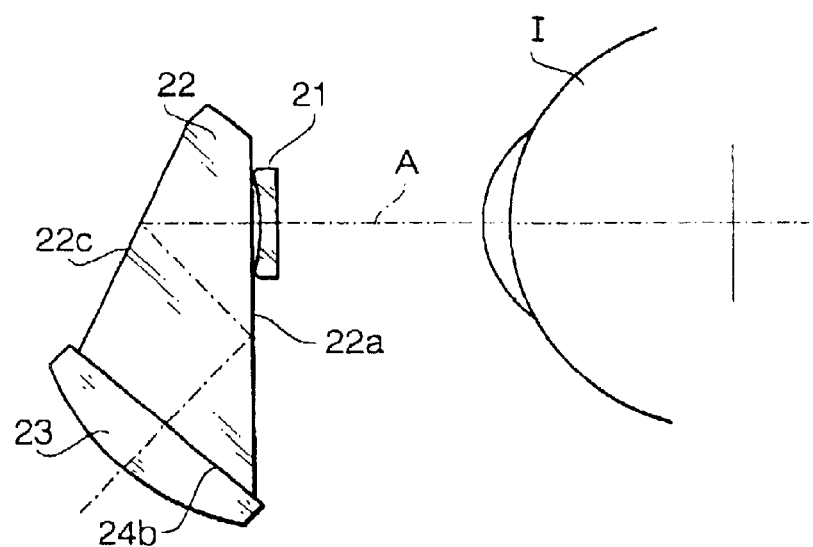
FIG. 11 shows an arrangement of an optical system of the magnifying lens unit shown in FIG. 9.
Figure 12:
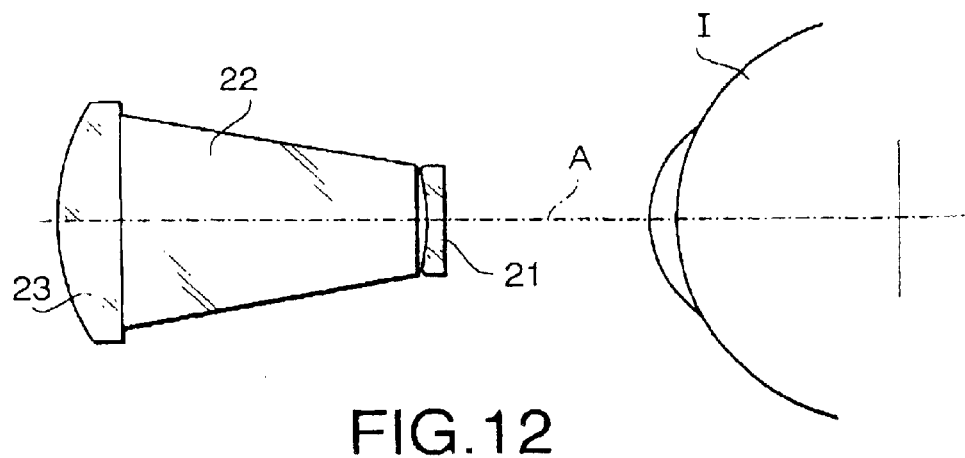
FIG. 12 is a development of the optical system shown in FIG. 10, in which an optical axis A thereof is linearly expanded.

FIG. 11 shows the arrangement of the optical system of the magnifying lens unit 3, and FIG. 12 is a development of the optical system shown in FIG. 11, in which an optical axis A thereof is linearly expanded.

The prism 22 has a top and bottom surfaces, which are parallel to each other, and at least first, second and third side surfaces 22a, 22b, and 22c which are perpendicular to the top and bottom surfaces. Each of the first, second and third side surfaces 22a, 22b and 22c is planar and has a generally rectangular form.

The second side surface 22b is connected at one end thereof with the first side surface 22a at an angle of 45 degrees, and at the other end thereof with the third side surface 22c at an angle of 112.5 degrees. The first and second side surfaces 22a and 22b are transparent while the third side surface 22c is coated with a reflecting layer (not shown).

The ocular 21 is a negative plano-concave lens and is disposed such that the concave surface faces the first side surface 22a of the prism 22.

The objective lens 23 is a positive plano-convex lens attached to the second side surface 22b of the prism 22 at its plane surface with adhesives. The objective lens 23 is formed such that its focal point at the ocular side generally coincides with the focal point of the ocular 21 at the objective lens side. Thus, the objective lens 23 constitutes in cooperation with the ocular 21 a Galilean telescope.

It should be noted, however, that the positions of the focal points of the ocular 21 and the objective lens 23 may vary when the diopter of the magnifying lens unit 3 is adjusted in accordance with the eyesight of the wearer and the distance to the object.

The optical axis A of the magnifying lens unit 3 passes through the ocular 21 and enters the prism 22 by perpendicularly penetrating the first side surface 22a thereof. Then, the optical axis A is bent at the third side surface 22c, which is coated with the reflecting layer, towards the first side surface 22a. Next, the optical axis A impinges on the first side surface 22a with an incident angle of 45 degrees which is greater than the critical angle of the prism's material, glass, for example. Thus, the optical axis A is bent again at the first side surface 22a by total internal reflection and extends towards the second side surface 22b. Finally, the optical axis A penetrates perpendicularly the second side surface 22b and passes through the objective lens 23.

The optical axis A exiting from the objective lens 23 is inclined 45 degrees downwards from that entering to that ocular 21. Accordingly, the wearer of the magnification viewer 1 can observe an object, through the magnifying lens unit 3, which is located in a direction 45 degrees downwards from the sight line looking into the magnifying lens unit 3.

It should be noted that direction of the optical axis A exiting from the objective lens 23 may be varied by suitably changing the angle between the first, second and third side surfaces (22a–22c).

It should be also noted that the ray from the object and passing through the magnifying lens unit 3 is reflected twice within the prism 22 and thus the wearer can observe a not inverted image of the object through the magnifying unit 3.

Figure 13:
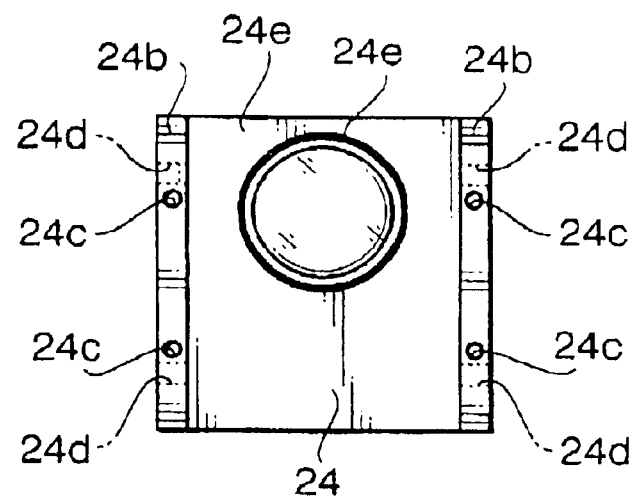
FIG. 13 is a front view of a base plate of the magnifying lens unit 3 shown in FIG. 7.

FIG. 13 is a front view of the base plate 24 of the magnifying lens unit 3 shown in FIG. 7. The base plate 24 is made of hard material such as metal or industrial plastic. A flange 24b is provided along each side edge of the base plate 24 to form a recess 24a therebetween which has a width substantially the same as that of the prism 22.

Each flange 24b is provided with a pair of fixing holes 24c. Each fixing hole 24c is bored through the flange 24b near the top or bottom end thereof from the front side (left side in FIG. 9) to the back side (right side in FIG. 9). These fixing holes 24c are formed at locations corresponding to the locations of the fixing holes 14b of the eyeglasses 14.

Each flange 24b is further provided with four screw holes 24d. Each screw hole 24d is formed between one of the fixing holes 24c and the top/bottom end of the flange 24b so as to penetrate the flange 24b from the outer side to the inner side.

A set screw (not shown) is screwed into each of the screw holes 24d to abut against and thereby fix the prism 22 received in the recess 24a of the base plate 24.

Note that the prism 22 is fixed to the base plate 24 with the first side surface 22a facing the bottom of the recess 24a, but slightly spaced apart therefrom to ensure the total internal reflection of a light impinging on the first side surface 22a along the optical axis A of the magnifying lens unit 3.

Now referring to FIG. 10, the lens barrel 25 is a tubular casing holding the ocular 21 therein. The lens barrel 25 has threads on the outer surface thereof and fixed to the base plate 24 by being screwed into a screw hole 24e thereof (see FIG. 13). Since the lens barrel 25 is screw coupled to the base plate 24, the position of the ocular 21 and hence the diopter of the magnifying lens unit 3 can be adjusted, in accordance with the eyesight of the wearer, by varying the amount of the lens barrel 25 being screwed into the base plate 24.

The lens barrel 25 has an outer diameter slightly smaller than that of the through hole 14a formed to the eyeglass 14. Thus, the lens barrel 25 can be located within the through hole 14a when the magnifying lens unit 3 is mounted to the eyeglass 14.

Now referring to FIG. 5, each magnifying lens unit 3 is disposed in front of one of the eyeglasses 14 such that the end of the lens barrel 25 is located within the through hole 14a. Each magnifying lens unit 3 is fixed to the corresponding eyeglass 14 with bolts 26 that are passed through the fixing holes 24c of the base plate 24 and through the fixing holes 14b of the eyeglass 14 and then engaged with a nut 27 at the wearer side of the eyeglass 14. A washer or spacer 28 may be provided to each bolt 26 between the base plate 24 and the eyeglass 14 for adjusting the gap therebetween and hence the direction of the optical axis of the ocular 21, as will be described later. In the present embodiment, the spacer 28 is provided only to the bolts 26 at the upper side of each magnifying lens unit 3 as shown in FIG. 6.

Figure 14:
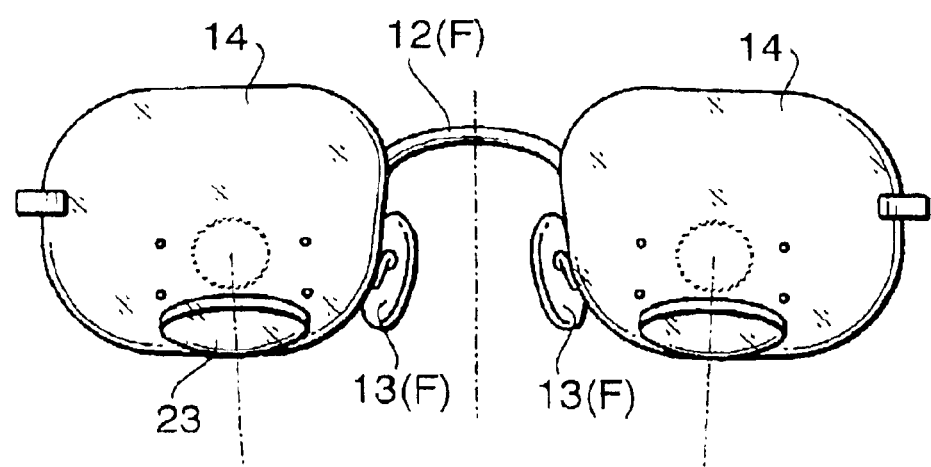
FIGS. 14 and 15 are front and top views of the magnification viewer shown in FIG. 4, respectively.
Figure 15:
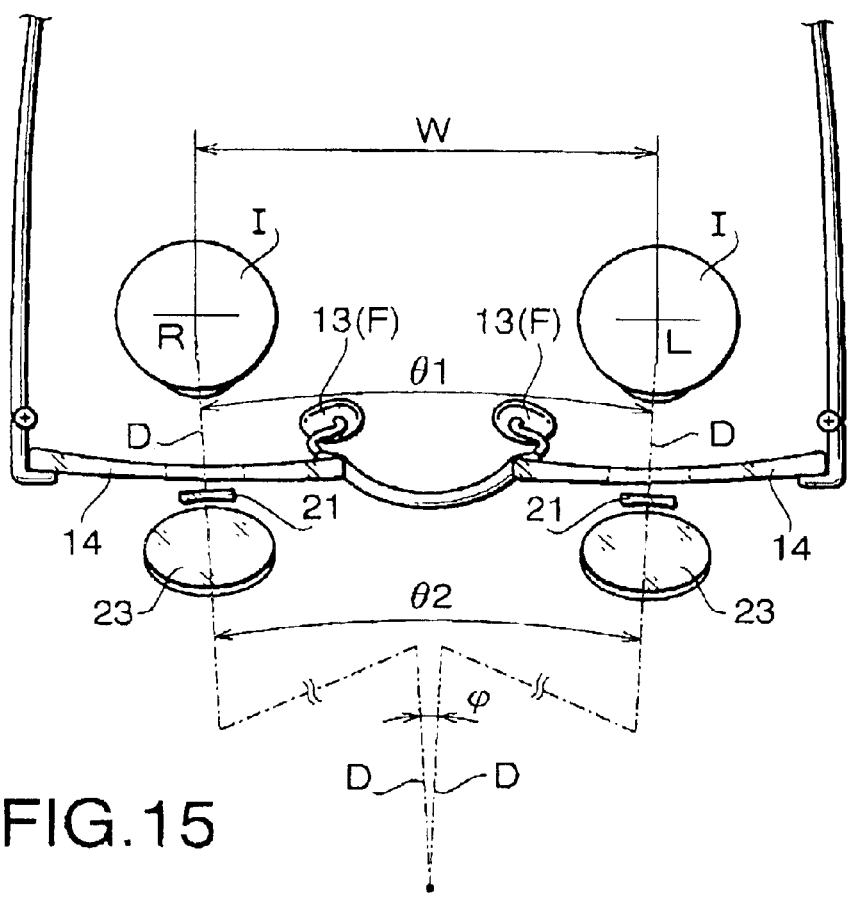
Figure 16:
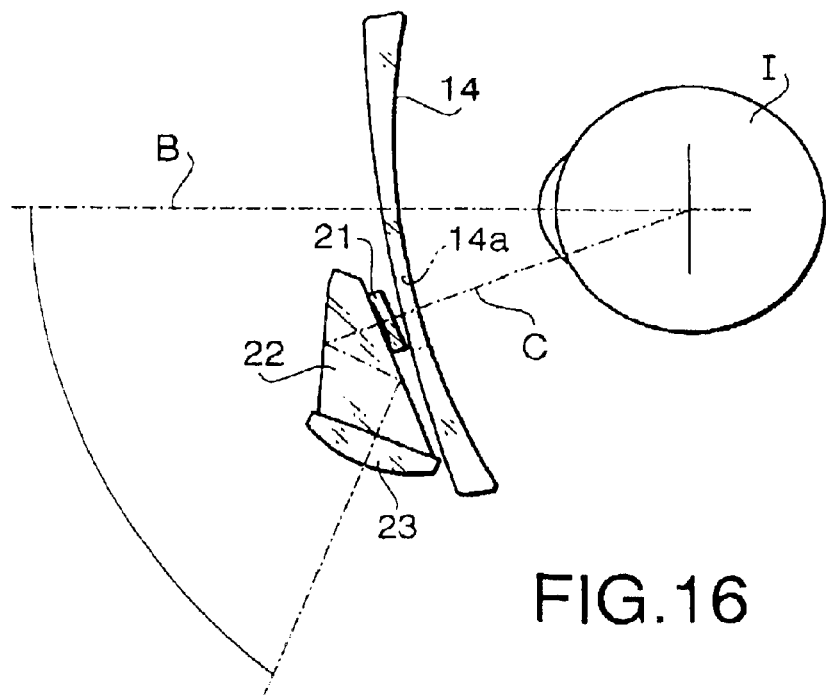
FIG. 16 is a side view of the magnifying lens unit and the eyeglass of the magnification viewer shown in FIG. 4.

FIGS. 14 and 15 are front and top view of the magnification viewer 1 shown in FIG. 4, respectively, and FIG. 16 is a side view of the magnifying lens unit 3 and the eyeglass 14 of the magnification viewer 1 shown in FIG. 4. Note that the prism 22, the base plate 24, the lens barrel 25, the bolts 26 and the spacers 28 are omitted in these drawings.

As shown in FIG. 16, each magnifying lens unit 3 is fixed to the eyeglass 14 at a location slightly lower than the optical axis thereof. Thus, the wearer can observe an object through the eyeglasses 14 and use the magnification viewer 1 like a normal spectacles by directing the eyes I straight forward, as shown by the dot-dash line B, and also a magnified image of an object through the magnifying lens units 3 by turning the eyes I slightly downwards, as shown by the dot-dash line C.

As shown in FIG. 15, the through holes 14a, 14a are formed on lines D, D that connect an object 200, placed 40 cm away from the face of the wearer, for example, and the center of the eyeballs I, I of the wearer. The magnifying lens units 3, 3 are fixed to the respective eyeglasses 14, 14 such that the angle θ1 between the sight lines of the wearer observing the object 200 therethrough coincides with an convergence angle Φ defined between the lines D, D. The position of each magnifying lens units 3 is further adjusted, by pivoting it about the optical axis of the ocular 21 thereof, so that the angle θ2 between the optical axes of the objective lenses 23 also coincides with the convergence angle Φ.

The magnifying lens units 3 fixed to the eyeglasses 14 as above allows the wearer to observe the object therethrough with a normal feeling.

It should be noted that the positions of each magnifying lens unit 3 about the optical axis of the ocular 21 thereof is sometimes further varied to adjust the postures of the images observed through the left and right magnifying lens units 3, and that the angle θ2 between the optical axes of objective lenses 23 may deviate from the convergence angle Φ due to this adjustment.

As described above, the magnification viewer 1 according to the first embodiment of the invention is provided with a magnifying lens unit 3 by which the optical axis thereof is deflected, by the prism 22 disposed between the ocular 21 and the objective lens, downwards with respect to the sight line of the wearer observing an object through the magnifying lens unit 3. Accordingly, the magnification viewer 1 allows the wearer to observe an object placed below his/her head without bending his neck and thereby sustaining damage thereto.

Second Embodiment

FIGS. 17 and 18 are front and top views of a magnification viewer 5 according to a second embodiment of the invention, respectively. The magnification viewer 5 shown in FIGS. 17 and 18 is a modification of that shown in FIGS. 4 and 5, and differs therefrom only in that the eyeglasses 14 are replaced with eyeglasses 44 and the magnifying lens units 3 are replaced with magnifying lens units 6.

The eyeglasses 44 may be positive lenses, negative lenses and even curved glasses having no power, depending on the eyesight of a wearer.

Each eyeglass 44 is provided with a circular through hole 44a. Each through hole 44a is formed at a location displaced slightly upwards from the center of the eyeglass 44, or the optical axis of the eyeglass 44 if the eyeglass 44 is either of positive or negative lens. The through holes 44a are also formed such that the distance therebetween is slightly shorter than the wearer's pupil distance.

Figure 19:
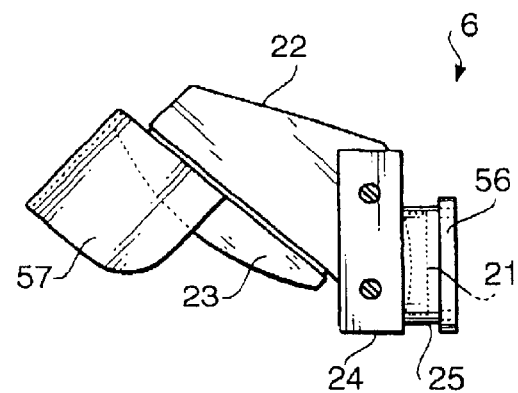
FIG. 19 is a side view of the magnifying lens unit of the magnification viewer shown in FIGS. 17 and 18.
Figure 20:
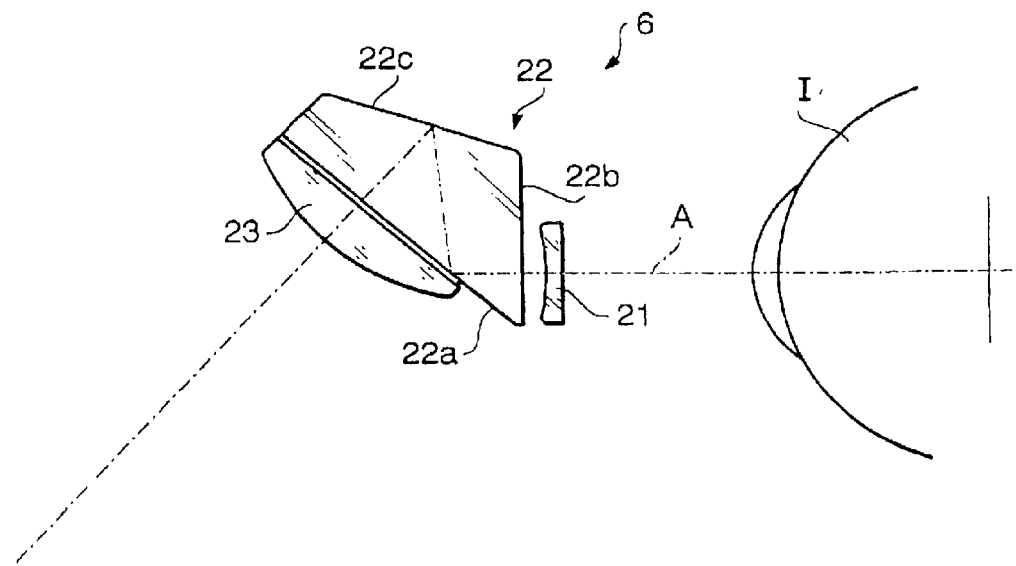
FIG. 20 shows optical elements of the magnifying lens unit shown in FIG. 19.

FIG. 19 is a side view of the magnifying lens unit 6 of the magnification viewer 5 shown in FIGS. 17 and 18, and, FIG. 20 shows optical elements of the magnifying lens unit 6 shown in FIG. 19 together with an eyeball I of the wearer.

The magnifying lens unit 6 is a modification of the magnifying lens unit 3 shown in FIG. 9 and differs therefrom in that it further has a ring screw 56 and a lens hood 57.

The ring screw 56 is a ring provided with an internal thread at the inner circumference thereof and has an outer diameter larger than the size of the through hole 44a formed to the eyeglass 44. The ring screw 56 is screw coupled with the end of the lens barrel 25 for mounting the magnifying lens unit 6 to the eyeglass 44 as will be described latter.

The hood 57 is a semi-cylindrical opaque member having an inner diameter substantially same as the outer diameter of the objective lens 23. The hood is fixed with adhesive to the upper half of the outer circumference of the objective lens 23 to prevent light transmitting outside the entrance pupil of the objective lens 23 from passing through the prism 22 and entering the eye of the wearer. The hood 57 is useful, for example, in preventing flare caused by direct incidence of the light from an illumination lamp of an operating room.

The magnifying lens unit 6 differs from that shown in FIG. 9 also in the arrangement of the prism 22. That is, the prism 22 is arranged such that the second side surface 22b faces the concave surface of the ocular 21 and the first surface 22a faces the plane surface of the objective lens 23.

It should be noted that the area of the magnifying lens unit 6 that opposes the front surface of eyeglass 44 becomes considerably small when the prism 22 is arranging as above. Accordingly, a large area remains on the eyeglass 44 through which the wearer can observe the normal image of the object 200 even if the magnifying lens unit 6 is fixed thereto.

The objective lens 23 is held by a not shown holding member such that the plane surface thereof is located in parallel with the first side surface 22a of the prism 22 with a thin air layer therebetween. The objective lens 23 is held as above to ensure the total internal reflection, at the first side surface 22a of the prism 22, of the light that proceeds along the optical axis A of the magnifying lens unit 6.

By the magnifying lens unit 6 arranged as above, the optical axis A thereof passes through the ocular 21 and penetrates perpendicularly the second side surface 22b of the prism 22. Then, the optical axis A is bent at the first side surface 22a of the prism 22 towards the third side surface 22c by total internal reflection. Next, the optical axis A is bent back towards the first side surface 22a at the third side surface 22c, penetrates the first side surface 22a perpendicularly, and passes through the objective lens 23 to exit the magnifying lens unit 6.

The magnifying lens unit 6 is mounted to the eyeglass 44 through the following procedure. First, the magnifying lens unit 6 is located in front of the eyeglass 44 and the lens barrel 25 is inserted into the through hole 44a. Then, the ring screw 56 is screwed on the end of the lens barrel 25 that has passed through the through hole 44a towards the rear side of eyeglass 44. The screw hole 56, having larger outer diameter than the size of the through hole 44a, sandwiches the eyeglass 44 with the base plate 24 and thereby prevents the magnifying lens unit 6 from dropping down from the eyeglass 44.

Next, the postures of the two magnifying lens units 6 are adjusted to direct the optical axes of the oculars 21 towards the respective eyes of the wearer, and also to adjust the angles between optical axes of the oculars 21, and between the optical axes of the objective lenses 23 to the convergence angle φ defined between the lines connecting the object 200 and the respective eyes of the wearer to allow the wearer to observe the object with a natural feeling.

It should be noted that the posture of each magnifying lens unit 6 is sometimes further varied to adjust the rotation or inclination of the images observed through the left and right magnifying lens units 6, and that the angle between the optical axes of objective lenses 23 may deviate from the convergence angle φ due to this adjustment.

After the posture of the magnifying lens barrel 25 has been adjusted as above, the space between the lens barrel 25 and the through hole 44a of the eyeglass 44 is filled with adhesive to fix the magnifying lens unit 6 to the eyeglass 44.

FIGS. 21A and 21B schematically show a wearer's head wearing the magnification viewer 5 shown in FIGS. 17 and 18.

The magnification viewer 5 arranged as above allows the wearer to observe, through the magnifying lens unit 6, a magnified image of the object 200 located near the face, 40 cm away therefrom, for example, by inclining the face slightly downwards and directing the sight line horizontally, or turning the eyes slightly upwards, as shown in FIG. 21A. Accordingly, the eyes or the neck do not become tired or suffer damages even if the wearer observes the magnified image for a long time period such as during a surgical operation.

The wearer can also observe a normal image of the same object 200, or an image of the object 200 not magnified by the magnifying lens unit 6, through the eyeglass 14 below the magnifying lens unit 6 without moving the face but by only turning the eyes downwards, for 37 degrees, for example, as shown in FIG. 21B. Thus, the wearer can quickly compare the magnified image and the normal image of the object.

Third Embodiment

FIG. 22 schematically shows a part of a magnification viewer according to a third embodiment of the invention. The magnification viewer according to the third embodiment of the invention is a modification of that according to the first embodiment, and differs therefrom only in that the through hole 14a of the eyeglass 14 is formed at the upper half thereof so that the magnifying lens unit 3 is fixed thereto at higher position compared to that in the first embodiment. This arrangement allows the wearer to observe the object also through the portion of the eyeglass 14 below the magnifying lens unit 3. Accordingly, the wearer can observe the magnified image through the magnifying lens unit 3 and the normal image through the eyeglass 14 by only turning the eyes up and down but without bending the neck.

Note that the arrangement of the magnification unit 3 according to the third embodiment of the invention is essentially same as that of the first embodiment except that mentioned above.

Fourth Embodiment

Now, an magnification viewer according to the fourth embodiment of the invention will be described. The magnification viewer according to the fourth embodiment is configured same as the magnification viewer of the second embodiment except that it includes a mirror and a half mirror in front of each eyeglass 44.

FIG. 23 schematically shows the arrangement of the mirror 80 and half mirror 81 of the magnification viewer according to the fourth embodiment of the invention.

The mirror 80 is located in front of the portion of the eyeglass 44 below the magnifying lens unit 3 and the half mirror 81 is located in front of the objective lens 23 to reflect a part of the light coming from the object while allowing the other part passing therethrough and entering the magnifying lens unit 6.

The mirror 80 and the half mirror 81 are arranged such that an optical path L1 is formed that extends from the object 200 along the optical axis A of the magnifying lens unit 6, bent by the half mirror 81 towards the mirror 80, and further bent by the mirror 81 towards the eye I of the wearer.

By the magnification viewer arranged as above, the wearer can observe the enlarged image of the object 200 through the magnifying lens unit 6, and also the normal image of the same object 200 from the same direction through the portion of the eyeglass 44 below the magnifying lens unit 6.

Fifth Embodiment

Now, an magnification viewer according to the fifth embodiment of the invention will be described. The magnification viewer according to the fifth embodiment is configured the same as that according to the first embodiment of the invention except that it includes first and second mirrors in front of each eyeglass 14.

FIG. 24 schematically shows the arrangement of the first and second mirrors 90 and 91 of the magnification viewer according to the fifth embodiment of the invention. The first mirror 91 is located in front of the eyeglass 14 on a line M that extends from the eye of the wearer and passes through the center of the eyeglass 14. The second mirror 91 is located in front of the upper end of eyeglass 14.

The first and second mirrors 90 and 91 are arranged such that an optical path L2 is formed that extends from the eye of the wearer along the line M, bent back at the first mirror 90 at an angle slightly smaller than 45 degrees upwards, and bent again at the second mirror to intersect with the optical axis A of the magnifying lens unit 3 at about 40 cm away therefrom.

By the magnification viewer arranged as above, the wearer can observe both the enlarged image of the object through the magnifying lens unit 3 and the normal image of the object through the eyeglass 14 without bending the neck but by only turning the eyes slightly up and down.

Other Variations

It should be noted that the prism 22 shown in the embodiments above may be replaced with two mirrors that are arranged to bend the optical axis of the magnifying lens unit in the same manner as the prism 22 does.

Further, the magnifying lens unit in the embodiments above may be arranged to constitute a Keplerian type telescope, instead of the Galilean type telescope, which have an image inverting optical system between the ocular and the objective lens. In this case, a prism or a mirror of the image inverting optical system may be utilized for deflecting the optical axis of the magnifying lens unit.

Further, the prism of the magnifying lens unit, or the element for deflecting the optical axis of the magnifying lens unit, may be placed in front of objective lens, instead of between the ocular and the objective lens.

The present disclosure relates to the subject matters contained in Japanese Patent Applications No. P2001-316561, filed on Oct. 15, 2001, and No. P2002-108300, filed on Apr. 10, 2002, which are expressly incorporated herein by reference in their entireties.

What is claimed is:

1. An optical device for observing an object therethrough, comprising:

a frame adapted to be supported on a wearer;

at least one lens unit coupled to said frame so as to allow the wearer to observe the object therethrough;

at least one eyeglass held by said frame; and a reflecting system disposed in front of said eyeglass, said reflecting system bending a sight line of the wearer towards the object when said wearer looks through an other portion of said eyeglass, wherein said lens unit includes a deflector that deflects a view direction of the wearer looking into said lens unit, and is configured such that an outward sight line emerging from said lens unit is deflected with respect to an inward sight line entering into said lens unit so as not to be parallel to said inward sight line, and wherein said lens unit is fixed to a portion of said eyeglass so as to allow the wearer to observe an image not through said lens unit but through said other portion of said eyeglass.

2. The optical device according to claim 1, wherein said lens unit provides a magnified image of the object.

3. The optical device according to claim 1, wherein said lens unit is fixed to said eyeglass so as to allow the wearer to observe the object through said other portion of said eyeglass without inclining a head.

4. The optical device according to claim 3, wherein said lens unit is fixed to said eyeglass at a location displaced from an optical axis of said eyeglass in a direction opposite to a direction in which the view direction of the wearer looking into said lens unit is deflected by said deflector.

5. The optical device according to claim 4, wherein said lens unit is fixed to said eyeglass at a position vertically displaced from the optical axis of said eyeglass.

6. The optical device according to claim 1, said reflecting system bends the sight line to extend towards the object along an optical axis of said lens unit.

7. The optical device according to claim 6, wherein said reflecting system includes:

a half mirror disposed on the optical axis of said lens unit between the object and said lens unit, said half mirror reflecting a part of the light coming from the object along the optical axis of said lens unit; and a mirror disposed in front of said eyeglass on the sight line of the wearer looking through said other portion of said eyeglass, said mirror reflecting the light from said half mirror towards the eye of the wearer.

8. The optical device according to claim 1, wherein said deflector deflects the view direction of the wearer downwards.

9. The optical device according to claim 1, wherein said frame is a spectacles frame.

10. An optical device for observing an object therethrough, comprising:

a frame adapted to be supported on a wearer; and at least one lens unit coupled to said frame so as to allow the wearer to observe the object therethrough, wherein said lens unit includes a deflector that deflects a view direction of the wearer looking into said lens unit, is configured such that an outward sight line emerging from said lens unit is deflected with respect to an inward sight line entering into said lens unit so as not to be parallel to said inward sight line, wherein said lens unit includes an ocular and an objective lens constituting together a Galilean telescope, and wherein said deflector is disposed between said ocular and said objective lens to deflect an optical axis of said lens unit such that the image of the object observed therethrough is not inverted.

11. The optical device according to claim 10, wherein said deflector includes a prism disposed between said ocular and said objective lens.

12. The optical device according to claim 10, wherein said deflector deflects the view direction of the wearer downwards.

13. The optical device according to claim 10, wherein said frame is a spectacles frame.

14. A magnifying lens unit to be mounted to a pair of spectacles, comprising;

an ocular having a first optical axis;

a deflector disposed in front of said ocular, said deflector deflects the first optical axis;

an objective lens having a second optical axis, said objective lens being disposed such that the second optical axis coincides with the first optical axis deflected by said deflector, wherein said deflector is configured such that an outward sight line emerging from said lens unit is deflected with respect to an inward sight line entering into said lens unit so as not to be parallel to said inward sight line, and wherein said ocular and said objective lens constituting a Galilean telescope, and said deflector deflects said first optical axis an even number of times.

15. The magnifying lens unit according to claim 14, wherein said deflector includes a prism disposed between said ocular and said objective lens.

16. A magnification viewer for observing an object therethrough, comprising:

a pair of spectacles having a frame and a pair of eyeglasses mounted to said frame; and a pair of magnifying lens units each including an ocular and an objective lens, each of said magnifying lens unit being mounted to respective one of said eyeglasses, each of said magnifying lens units including a deflector that deflects an optical axis of said magnifying lens unit so that the optical axis at said ocular inclines against the optical axis at said objective lens, wherein said deflector is configured such that an outward sight line emerging from said lens unit is deflected downwardly with respect to an inward sight line entering into said lens unit so as not to be parallel to said inward sight line, and wherein an angle between the optical axes of the pair of magnifying units coincides with a convergence angle when the wearer observes an object near the wearer.

17. The magnification viewer according to claim 16, wherein each of said magnifying lens units is fixed to a portion of said eyeglass so as to allow the wearer to observe an image not magnified by said magnifying lens units through other portions of said eyeglasses.

18. The magnification viewer according to claim 17, wherein each of said magnifying lens units is fixed to said eyeglass so as to allow the wearer to observe the object through said other portions of said eyeglasses without inclining the neck.

19. The magnification viewer according to claim 18, wherein each of said magnifying lens units is fixed to said eyeglass at a location displaced from an optical axis of said eyeglass in a direction opposite to a direction in which the optical axis of said magnifying lens unit is deflected by said deflector.

* * * * *